United States Patent [19]
Kilmer

[11] Patent Number: 5,893,992
[45] Date of Patent: Apr. 13, 1999

[54] PORTABLE ELECTRIC DESOLDERING TOOL

[75] Inventor: Paul R. Kilmer, Leroy, Mich.

[73] Assignee: Cooper Industries, Inc., Houston, Tex.

[21] Appl. No.: 08/926,801

[22] Filed: Sep. 10, 1997

[51] Int. Cl.[6] .................... H05B 1/00; B23K 1/00
[52] U.S. Cl. .................... 219/227; 219/230; 228/20.5
[58] Field of Search .................... 219/227, 230, 219/229, 231, 233, 236, 237; 228/264, 31, 20.5

[56] References Cited

U.S. PATENT DOCUMENTS

| | | | |
|---|---|---|---|
| 3,024,343 | 3/1962 | Siwakoski | 219/230 |
| 3,172,382 | 3/1965 | Weglin . | |
| 3,443,733 | 5/1969 | Parente | 219/230 |
| 3,842,240 | 10/1974 | Wakita et al. | 219/230 |
| 3,870,023 | 3/1975 | Wilson . | |
| 3,910,479 | 10/1975 | Kohler | 219/230 |
| 4,328,920 | 5/1982 | Vella . | |
| 4,435,636 | 3/1984 | Royston | 219/227 |
| 4,471,898 | 9/1984 | Parker . | |
| 4,568,819 | 2/1986 | Stacconi . | |
| 4,574,994 | 3/1986 | Rauchwerger . | |
| 4,768,699 | 9/1988 | Abbagnaro . | |
| 4,892,995 | 1/1990 | Del Pino Millan . | |
| 5,007,574 | 4/1991 | Carlomangno et al. . | |
| 5,080,277 | 1/1992 | Diaconu et al. . | |
| 5,135,153 | 8/1992 | Hooriani . | |
| 5,544,803 | 8/1996 | Jacks . | |

FOREIGN PATENT DOCUMENTS

| | | |
|---|---|---|
| 0417923 | 3/1991 | European Pat. Off. . |
| 2644946 | 4/1978 | Germany . |

OTHER PUBLICATIONS

Advertisement of Den-Ox Instruments (USA) Inc.: "Desoldering in the Future Today", U.S. Tech., p. 51, Aug. 1992.

Primary Examiner—Teresa Walberg
Assistant Examiner—Vimod D Patel
Attorney, Agent, or Firm—Burns, Doane, Swecker & Mathis, L.L.P.

[57] ABSTRACT

A portable electric soldering tool includes a housing forming a handle and a power head. A heating rod extends from the power head, the rod having an axial bore with a stainless steel lining to prevent solder from building up in the heating rod. A heating coil heats the heating rod. The heating rod directs melted solder into an extraction tube in which a curved wafer is disposed to collect the solder. A diaphragm pump is mounted in the power head and has an oblong piston head, which is mounted with the long axis aligned on a longitudinal axis of the tool, which facilitates a more compact unit.

25 Claims, 5 Drawing Sheets

PORTABLE ELECTRIC DESOLDERING TOOL

The present invention is directed to a tool for removing solder from electrical components, such as chips mounted to printed circuit boards. More particularly, the invention is directed to a portable tool for heating and removing solder.

The present invention provides a hand-held, self-contained electric desoldering tool that advantageously includes heating means and vacuum means in a single, easily manipulated device.

More particularly, the present invention relates to a desoldering tool having a pistol-shaped casing or housing with a handle portion and a power head portion. The power head portion contains a vacuum means, preferably a diaphragm pump driven by a DC motor, and heating means including a heating rod. The heating rod includes an axial bore extending from an exposed heating tip to an opposite exit end disposed in a solder collecting chamber. The axial bore is in communication with the vacuum means to draw a flow through the bore.

According to the invention, a stainless steel tube is disposed in the axial bore of the heating rod as a lining to help prevent solder from building up in and blocking the axial bore. The heating rod is formed of an easily heated material, such as brass or copper, which materials also have an affinity for solder. The stainless steel lining presents a low friction surface with a low affinity for solder, thus facilitating the flow of solder through the heating rod.

According to another aspect of the invention, the exit end of the axial bore feeds an extraction tube disposed in the power head of the housing between the heating rod and the vacuum means. Preferably, the extraction tube is formed of stainless steel and defines a chamber to collect and solidify melted solder drawn in by the vacuum means. A wafer, preferably having a curved profile, is disposed in the extraction tube for accumulating the melted solder by providing a structure in the flow path on which the solder can solidify. The wafer helps prevent solder from collecting on a filter that filters the air before it reaches the vacuum means. The wafer extends the life of the filter, thus extending the time between filter changes, which reduces expense and downtime.

The heating rod is supported by an outer tube and an inner, heater tube structure mounted in and extending from the power head of the housing. The outer tube is formed of a metal, for example, stainless steel, and forms an outermost barrel-like projection. The heater tube is disposed coaxially within the outer tube and has a narrower first section, a wider second section, and a frustoconical section joining the first and second sections.

According to the invention, the heating rod is mounted in the narrower first section of the heater tube with a tip extending forward through an open first end of the heater tube and a tail extending rearward into the second section. The extraction tube is disposed in the wider second section and has a first, or distal, end that extends into and abuts the frustoconical middle section to form a seal. The rearward end of the heating rod communicates with the extraction tube.

The heating rod is heated by a heating coil that surrounds a portion of the first section of the heater tube. According to the invention, the heating coil consists of at least two, and preferably, four windings. However, any number of windings could be used. According to a preferred embodiment, a first winding of the coil is connected in series with a motor for the vacuum source. In addition to heating the heating rod, the first winding acts as a resistance in a circuit to allow a smaller voltage motor for the vacuum pump. A second winding is wrapped over the first layer, and has a second end connected to the first terminal of the first layer. The third layer is wrapped over the second layer, and the fourth layer is wrapped over the third layer. The third and fourth windings are connected in a similar manner which minimizes the terminations needed to connect the windings.

Alternatively, the heating means comprises a ceramic heating element, shaped as a cylinder that surrounds the heating rod. Other heating means that are positionable in the heating tube or the outer tube for heating the rod are also possible.

According to another aspect of the invention, the desoldering tool includes a main power switch that activates the heating means. A trigger switch activates the vacuum pump motor intermittently as needed. By activating the vacuum only as needed, excessive cooling of the heating rod by the vacuum air drawn through the axial bore is avoided. In addition, when the motor is activated, the circuit delivers increased power to the heating coil which compensates for the cooling effect of the vacuum air. The heating rod thus more consistently remains at a suitable temperature for melting solder.

According to yet another aspect of the invention, a spool inserted in the extraction tube seals a proximal end of the extraction tube and provides an air path from the extraction tube to the vacuum pump. The spool includes a head that is disposed in the second section of the heater tube. A shoulder on the spool head abuts the proximal end edge of the extraction tube and exerts a force on the extraction tube to maintain the distal end in contact with the frustoconical section of the heater tube. A blind hole in a body portion of the spool opposite the head contains a spring that acts against a part of the housing to bias the spool against the extraction tube. The spring and blind hole eliminate the need for high tolerance in the spool, extraction tube, and heater tube, which keeps manufacturing costs low.

The air path formed in the head of the spool includes an axial cavity that leads to a hole at a neck portion of the spool. The hole can be formed as a cross hole extending across the neck to open on both sides of the neck, or a single hole. The head and neck of the spool are supported by a cuff in a pump cap that includes an inlet port for the pump. The neck has a reduced diameter relative to the head of the spool. The neck and an inner wall of the cuff define an annular chamber connecting the hole to the inlet port of the pump. Thus, the hole need not be precisely aligned with the inlet port to allow air to flow to the pump.

The neck of the spool is sealed in the cuff of the pump cap and extraction tube by sealing rings disposed in grooves in the head and body of the spool. A first ring seals the head of the spool to an inner surface of the extraction tube. A second ring seals the body of the spool to the cuff. An additional o-ring is disposed between the heater tube and the pump cap to seal the outer surface of the heater tube.

The vacuum means includes a diaphragm pump driven by a DC motor. The pump and the motor are mounted in the power head of the housing. According to the invention, the pump includes a piston having an oblong piston head, and accordingly, an oblong piston chamber. The piston head is positioned in the housing so that a width of the housing is a minimum, that is, the long axis of the oblong contour is aligned on an axial plane of the housing.

The pump chamber is defined by a valve block and a pump base which include ports and oblique stop surfaces opposite the ports. Valve flaps cover the ports and move under pressure to an open position against the oblique surfaces, which support the valve flaps and limit their movement to prevent excess bending of the flap hinge, thus facilitating the return to a closed position and extending the life of the flaps.

BRIEF DESCRIPTION OF THE DRAWINGS

The invention will be better understood by reference to the following detailed description in conjunction with the appended drawings, in which.

DETAILED DESCRIPTION

Figure 1:
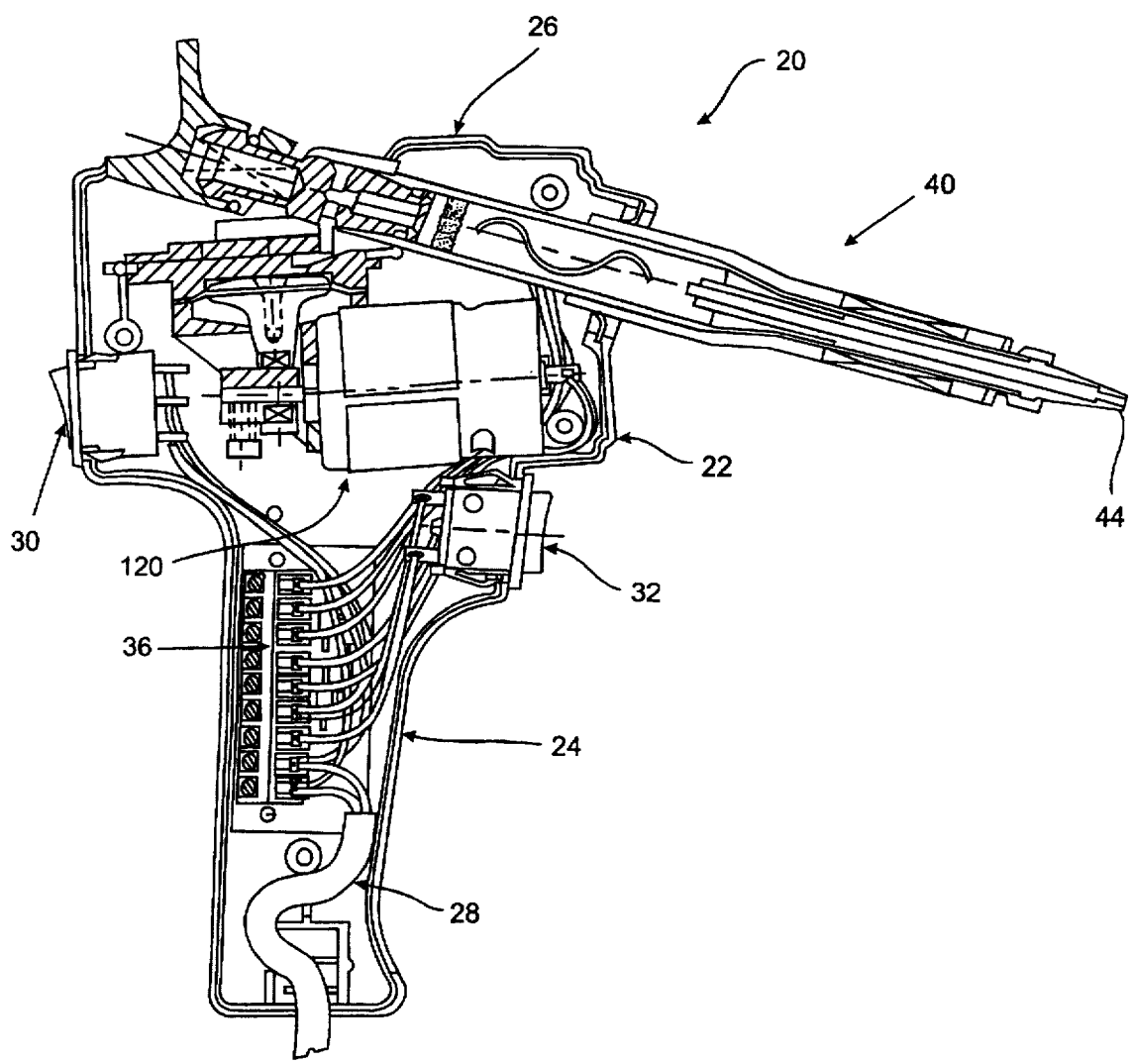
FIG. 1 is a section view of a solder removing tool in accordance with the invention.

A portable de-soldering tool 20 in accordance with the invention, illustrated in FIG. 1, includes a pistol-shaped housing 22 having a handle portion 24 and a power head portion 26. A power cord 28 connects the tool 20 to a source of power (not illustrated) by a plug (also not illustrated). A main power switch 30 activates the tool 20, as will be explained in detail below. A trigger switch 32 in the handle portion 24 intermittently activates a vacuum device 120.

The handle 24 of the tool contains a terminal block 36 for connecting the power cord to the electrical components of the tool.

A heating assembly 40 is mounted in the head portion 26 and extends in an axial direction from a forward end (at the heating tip 44) to a rearward end (at the main switch 30). The vacuum assembly 120 is also mounted in the head portion 26 and is in fluid flow communication with the heating assembly 40 to draw a vacuum at the heating tip 44 of the heating assembly. The heating assembly 40 heats solder on an electrical component, for example, at the leads connecting a chip on a printed circuit board, and the melted solder is drawn by the vacuum assembly 120 into the tool 20.

Figure 2:
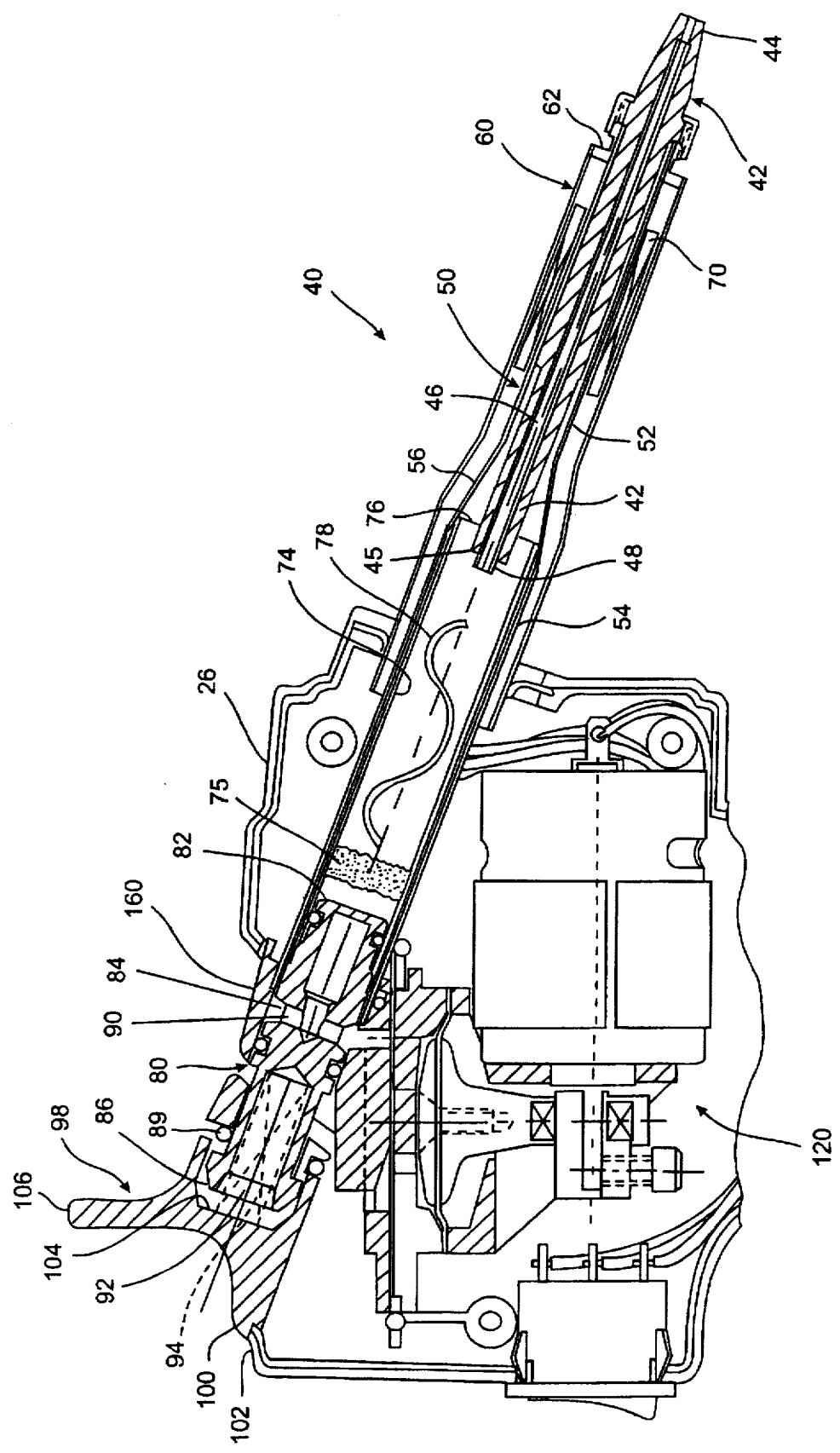
FIG. 2 is an enlarged section view of the head portion of the tool of FIG. 1 showing the heating assembly and vacuum assembly.

FIG. 2 shows an enlarged view of the head portion 26 of the tool 20. The heating assembly 40 includes a heating rod 42 mounted with the heating tip 44 extended at the forward end. The heating rod 42 is formed of a quickly heating material, preferably a metal like copper or brass, and has an axial bore 46 that extends the length of the heating rod. The bore 46 allows the vacuum means to remove melted solder from a device through the heating tip 44. A sleeve 48 is disposed in the bore 46 as a lining to prevent solder from collecting in the bore, which eventually would block the passage. The sleeve 48 is preferably formed of stainless steel, which provides a low friction surface with a low affinity for solder, and alternatively may be found of glass.

The heating rod 42 is mounted in a heating tube 50. The heating tube 50 is shaped with a first section 52, a second section 54 having a wider diameter than the first section, and a frustoconical midsection 56 joining the first section and second section. The heating rod 42 is inserted in the first section 52 and closely fits the first section. The tip 44 extends outwardly from the first section 52 of the heating tube 50, and a tail, or proximal end 45 of the heating rod extends rearward through the frustoconical section 56 and into the larger second section 54. The heating tube 50 is preferably formed of a corrosion resistant material, such as stainless steel.

An outer tube 60 is mounted in the head portion 26 of the casing 22 coaxially with the heating tube 50, and extends distally from the casing. The outer tube 60 provides a protective cover over the heating tube 50. A plug 62 at the distal end of the outer tube 60 supports the heating rod 42 and the first section 52 of the heating tube 50, and seals the ends of the outer tube 60 and heating tube 50 to prevent the inflow of air. The outer tube 60 is preferably formed of a corrosion resistant material such as stainless steel. The annular space between the heating tube 50 and the outer tube 60 can be filled with a solid material, for example, a ceramic, to insulate the heating tube 50 from the outer environment.

The second or proximal section 54 of the heating tube 50 is supported in a cuff 162 of a pump cap 160, described below.

Heating means 70 is disposed in the outer tube 60 and surrounds the first section 52 of the heating tube 50 where the heating rod 42 is in contact with the heating tube 50. The heating means 70 transfers heat to the heating rod 42. According to a preferred embodiment, the heating means 70 is a coil having a plurality of windings wrapped around the heating tube 50. Conveniently, wires connecting the heating means to the terminal 36 are routed in a space between the outer tube 60 and the heating tube 50.

Alternatively, the heating means 70 is a ceramic heating element shaped as a sleeve that is fitted on the heating tube 50.

An extraction tube 74 is disposed in the second section 54 of the heating tube for collecting solder sucked in through the axial bore 46 of the heating rod 42. The extraction tube 74 is preferably formed of a corrosion-resistant material such as stainless steel. A distal end 76 of the extraction tube 74 abuts the frustoconical section 56 of the heating tube to form a seal to prevent air from leaking into the extraction tube. The tail, or proximal end of the heating rod 42 is disposed in the extraction tube 74 so that solder drawn in through the axial bore 46 flows into the extraction tube. A filter 75 is positioned in the proximal end of the extraction tube to prevent solder and other contaminants from reaching the pump.

A wafer 78 is disposed in the extraction tube 74 to collect and solidify the melted solder. The wafer 78 is a thin, curved disk-like element that is interposed in a flow path of the extraction tube to be struck by molten solder carried into the extraction tube, which immediately cools and solidifies. The wafer 78 may have a wave-shape, as shown, or any non-planar shape so that it interrupts the flow pattern through the extraction tube. The wafer 78 is disposed without attachment in the extraction tube 74, that is, inserted with a friction fit into the extraction tube 74, for easy installation and removal. The wafer 78 collects solder that otherwise would collect on the filter 75. The wafer 78 thus extends the life of the filter, and accordingly the operating time of the tool before a filter change is needed.

Figure 3:
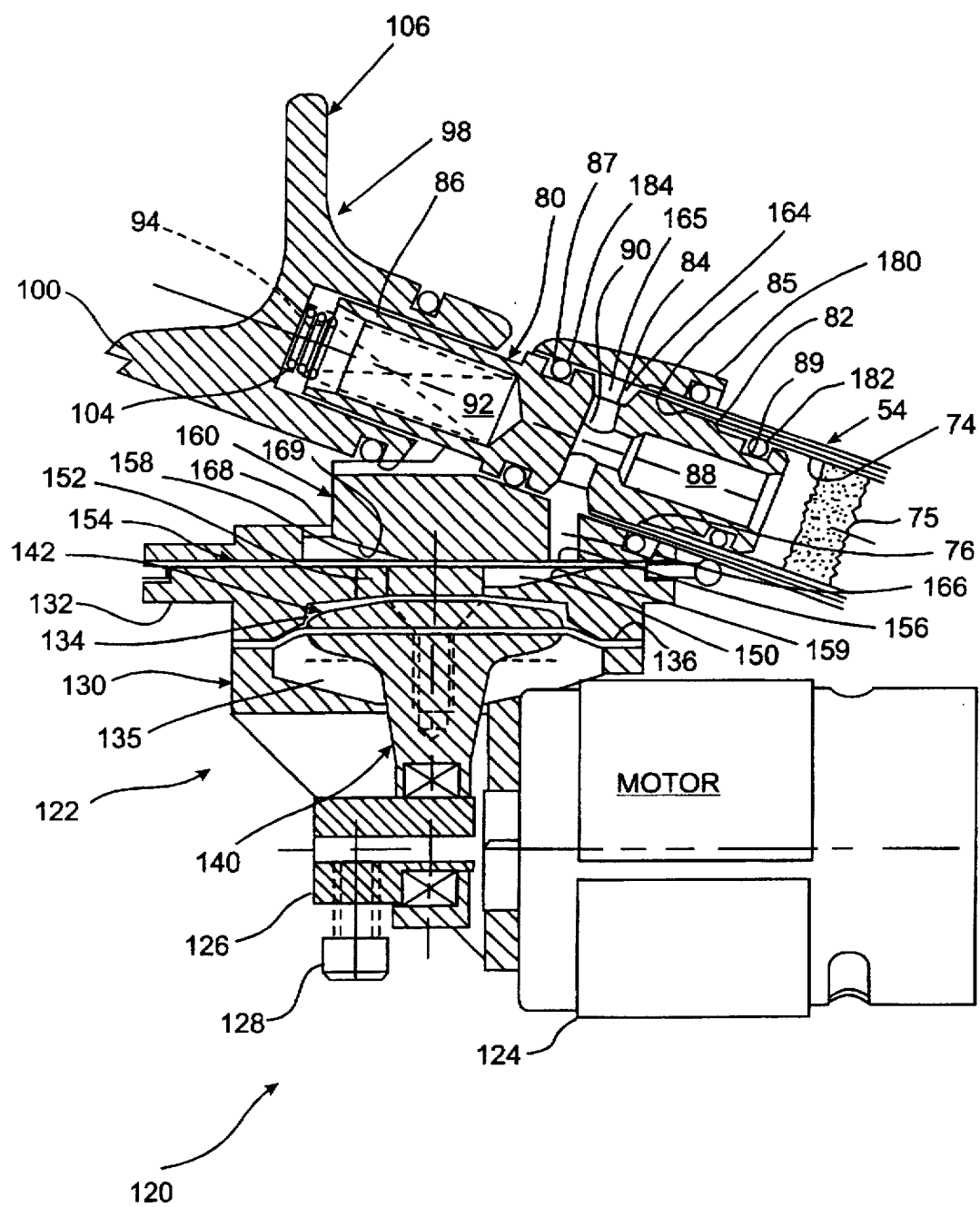
FIG. 3 is an enlarged section view showing the pump assembly of the tool of FIG. 1.

Referring now also to FIG. 3, in which the housing 22 has been removed and a portion of the head 26 enlarged for clarity, a spool 80 is disposed at the proximal ends of the extraction tube 74 and heater tube 54 and closes the proximal ends from the external environment. The spool 80 is a generally cylindrically shaped plug having a head 82, a neck 84 with a reduced diameter, and a body 86. The spool 80 is formed of a plastic material, rubber, or another resilient air-impervious material. The head 82 is inserted in the heater tube 54 and extraction tube 74. A shoulder 85 formed on the head 82 abuts the proximal end 76 of the extraction tube 74. An axial hole 88 formed in the head 82 communicates with the interior of the extraction tube 74 to provide a pathway for air to exit the extraction tube to the vacuum means 120. The axial hole 88 leads to a cross hole 90 in the neck 84 that extends laterally in opposite directions from the axial hole. The cross hole 90 opens on the outer surface of the neck 84 to allow air to pass from the spool 80. The cross hole 90 extends across the neck 84 to open on opposite sides of the neck. Alternatively, a simple hole extending from the axial hole to one side of the neck 84 can be used.

The body 86 of the spool 80 extends in a direction opposite the head 82, and includes an axially directed recess 92. A spring 94 (illustrated in phantom) is disposed in the recess 92 and acts against a latch 98 to bias the spool 80 toward the extraction tube 74. The force of the spool 80 on the extraction tube 74 maintains the distal end 76 of the extraction tube in contact with the frustoconical section 56 of the heater tube 50 (FIG. 2) to ensure the integrity of the seal formed by the extraction tube 74 and heater tube 50.

The latch 98 holds the spool 80 and extraction tube 74 assembly in place, and provides an easy means for removing the assembly for maintenance. The latch 98 is inserted into an opening in the housing 22 (FIG. 2) and is attached to the housing by a lip 100 that catches on a latching edge 102 of the housing. A well 104 in the latch 98 contains and positions the spring 94 that acts on the spool 80. The latch 98 is removed by pushing the latch 98 toward the spool 80, which compresses the spring 94, and lifting a lever 106 away from the housing to release the lip 100 from the latching edge 102. The latch can then be withdrawn from the housing 22, which allows access to the spool 80 and the extraction tube 74 for changing the filter 75 or wafer 78, or removing solder from the interior of the extraction tube.

Figure 4:
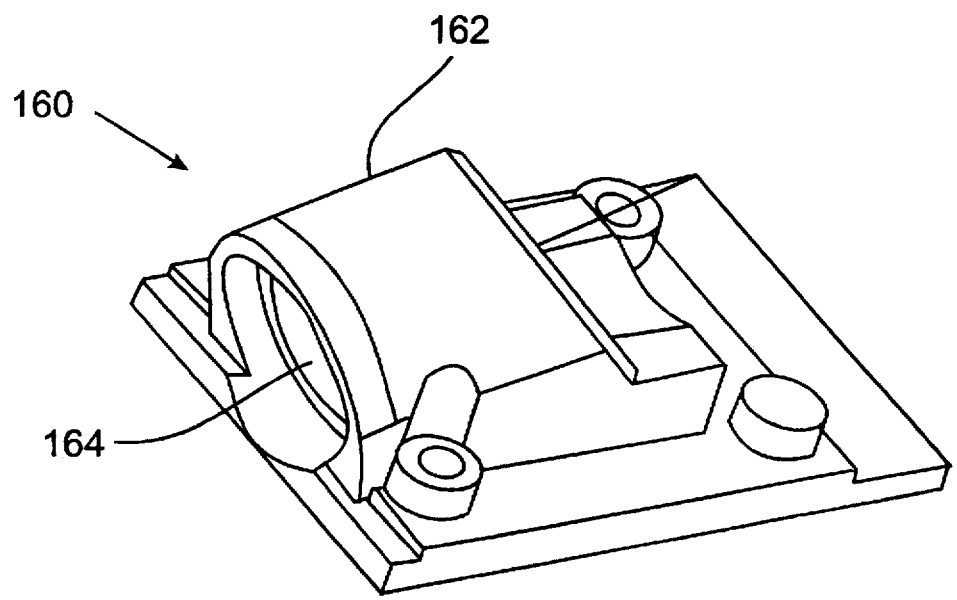
FIG. 4 is a perspective view of a pump cap.
Figure 5:
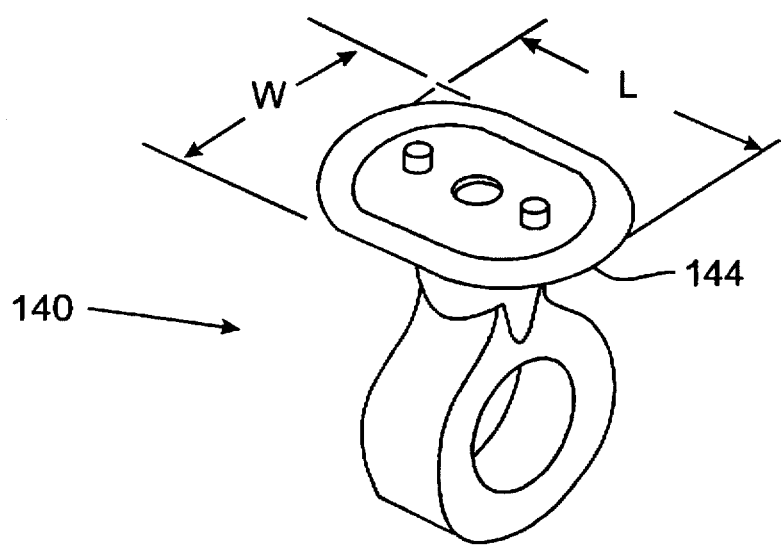
FIG. 5 is a perspective view of a pump piston having an oblong head.

Referring to FIGS. 3, 4 and 5, the vacuum means 120 includes a pump 122 and a motor 124 to drive the pump. The pump 122 includes a pump base 130 and a valve block 132 fastened together with a diaphragm 136 between. The pump base 130 and the valve block 132 have facing recesses defining, with the diaphragm, an upper piston chamber 134 and a lower piston chamber 135.

A piston 140 is fastened to the diaphragm by a connecting cap 142. The piston 140 is connected to the motor 124 by an eccentrically rotating shaft 126, which produces reciprocating movement of the piston 140 in the upper 134 and lower 135 piston chambers, which in turn causes movement of the diaphragm 136. A counterbalance 128, preferably a screw with an appropriately sized screw head, is threadedly fastened to the shaft 126. The length of the screw and the size of the head selected to properly balance the movement of the piston 140.

The valve body 132 includes an inlet port 150 and an outlet port 152. A valve diaphragm 154 covers the inlet port 150 and the outlet port 152, and includes an inlet flap 156 and an outlet flap 158 respectively positioned on the inlet port 150 and outlet port 152.

A pump cap 160, illustrated in FIG. 4, covers an upper side of the valve body 132 and provides a connection between the valve body and the spool 80. The pump cap 160 includes a cuff 162 having a central passage 164 in which the spool 80 is inserted. The neck portion 84 and adjoining portions of the head 82 and body 86 of the spool 80 are disposed in the central passage 164. The pump cap 160 includes an inlet passage 166 leading from the cylindrical passage 164 to the inlet port 150 of the valve body 132, and an outlet passage 168 leading from the outlet port 152 to outside the pump.

Between the neck 84 of the spool 80 and the inner wall 164 of the cylindrical passage, an annular chamber 165 is formed which connects the cross hole 90 in the spool 80 with the inlet passage 166 in the pump cap 160. The cross hole 90 delivers air to the annular chamber 165 which can then flow to the inlet passage 166. The annular chamber 165 eliminates the need to precisely align the cross hole 90 or alternative single hole with the inlet passage 166 which simplifies assembly.

A sealing system prevents air from leaking into the pump inlet. The heating tube 54 is sealed in the cuff 162 by an o-ring 180 seated in a counterbore in the cuff entrance. The head 82 of the spool 80 is sealed in the proximal end of the extraction tube 74 by a second o-ring 182 seated in a groove 89 in the head. In addition, the body 86 of the spool 80 is sealed in the cylindrical passage 164 by a third o-ring 184 disposed in a groove 87 in the body.

As may be understood by reference to FIG. 3, the inlet flap 156 opens by moving into the valve block 132 as the pump diaphragm 136 is moved downward and closes against a valve seat formed at the inlet passage 166 by the pump cap 160 when the pump diaphragm moves upward. Conversely, the outlet flap 158 opens by moving upward into the outlet passage 168 of the pump cap 160 when the pump diaphragm moves upward and is closes against a seat formed at the outlet port 152 by the valve block 132.

The inlet port 150 is formed with a stop wall 159 arranged obliquely to the valve diaphragm 154 to provide a stop limit for the inlet valve flap 156. The outlet passage 168 in the pump cap 160 is also formed with a stop wall 169 oriented obliquely to the valve diaphragm. The stop walls 159, 169 prevent excessive bending of the inlet valve flap 156 and outlet valve flap 158 in their respective open positions, which allows the flaps to respond better to close the ports, and prolongs the life of the flaps.

The pump includes features advantageous to the tool 20 according to the invention. The pump piston 140, illustrated in FIG. 5, has an oblong piston head 144, with a first axis L longer than a second perpendicular axis W. "Oblong" is intended to mean a non-circular closed curve, including elliptical, oval, and other similar shapes. The piston head 144 is positioned so that the long axis L is aligned in the longitudinal direction of the tool 20, running from the heating tip 44 to the main switch 30 (shown in FIG. 1) and the second axis W is aligned in the transverse direction. The shape of the piston head 144 facilitates mounting the pump in the power head 26 of the tool 20, and advantageously allows the tool housing 22 to have a narrower profile. An additional advantage is that the locations of the inlet port 150 and outlet port 152 in the valve block 132 are in better alignment, which improves the efficiency of the pump. In addition, the rocking motion of the piston 140 caused by the eccentrically rotating shaft 126 coincides with the shorter axis W, which facilitates balancing the piston.

Figure 6:
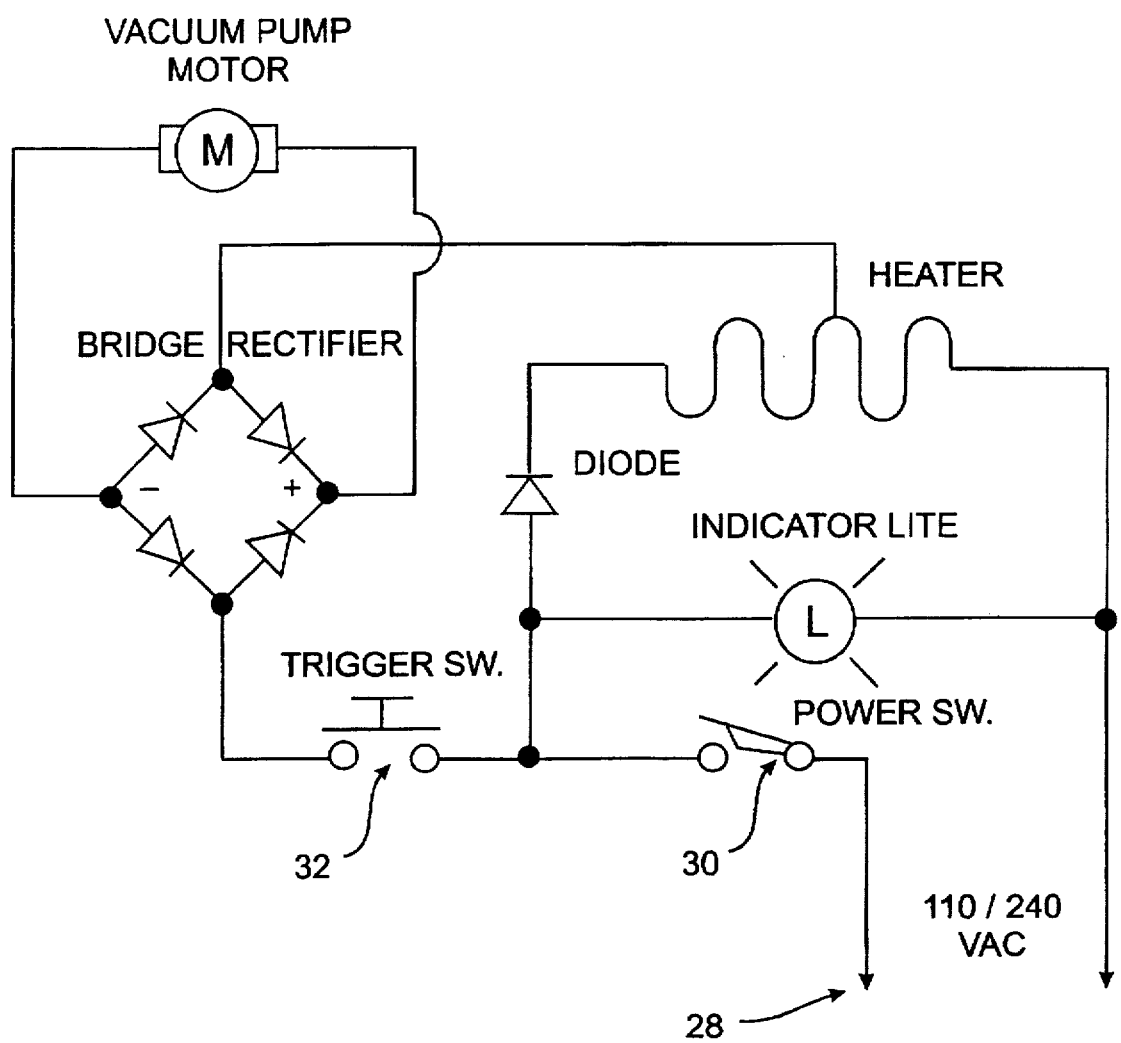
FIG. 6 is a schematic wiring diagram in accordance with the invention.

FIG. 6 is a schematic wiring diagram for the tool 20. Power to the unit is controlled by the main power switch 30. A separate trigger switch 32 intermittently activates the pump motor. In the on position, the main switch 30 allows power to a circuit including an indicator light and the heater coil. A half-wave rectifier diode provides power to the heater coil. Thus, with power on, the heater coil is activated to heat the heating rod. A bridge rectifier converts the ac power coming into the tool to dc power for the pump motor, which allows the use of a smaller dc motor to drive the pump. The pump motor is connected in series to a portion of the heating coil, as indicated by the line entering the heating coil at about the midpoint, so that the portion of the heating coil acts as a resistance in the motor circuit, which allows a smaller motor to be used.

When the trigger switch activates the motor, heater output is boosted by the motor circuit. The additional heat output compensates for the cooling effect of the vacuum air drawn through the heating rod axial bore.

The invention has been described in terms of preferred principles, structure and steps, however, those of skill in the art will appreciate that the invention may be practiced other than as described and substitutions and equivalents may be used without departing from the scope of the invention as defined in the following claims.

What I claim is:

1. A portable electric desoldering tool, comprising:
    a portable housing;
    a heating rod having an axial bore supported in the housing and extending therefrom;
    a stainless steel sleeve disposed in the axial bore to form a solder passage;
    an inner tube supported in the housing, the inner tube having a first section, a second section with a diameter greater than the first section, and a frustoconical portion joining the first and second ends;
    an extraction tube having an entry end, the extraction tube being mounted in the inner tube with the entry end abutting the frustoconical portion to form a seal and extending into the second section, wherein an exit end of the sleeve communicates with the entry end of the extraction tube; and
    vacuum means mounted in the housing and connected to draw a vacuum through the extraction tube, axial bore and sleeve to extract a flow of solder into the extraction tube.

2. The tool as claimed in claim 1, further comprising accumulator means disposed in the extraction tube to collect melted solder drawn into the extraction tube.

3. The tool as claimed in claim 2, wherein said accumulator means comprises a curved wafer interposed in an airflow path in the extraction tube.

4. The tool as claimed in claim 1, wherein the extraction tube is formed of stainless steel.

5. The tool as claimed in claim 1, further comprising means for biasing the extraction tube into contact with the frustoconical portion of the inner tube.

6. The tool as claimed in claim 1, further comprising:
    an outer tube mounted in the housing and extending therefrom;
    the inner tube being disposed in the outer tube; and
    heating means surrounding the inner tube and disposed in a space between the inner tube and the outer tube, wherein the heating tip is disposed coaxially in the inner tube and extends through a portion of the inner tube including said heating means.

7. The tool as claimed in claim 6, further comprising a spool having a head, an end of said head disposed in an exit end of the extraction tube, the head end having an elongated, axial cavity communicating with the extraction tube and leading to a hole extending outward therefrom at a neck, the cavity and a cross-hole providing a flow path to the vacuum means, wherein the vacuum means includes a mating collar in which the neck of the spool is disposed, the vacuum means having an inlet in the mating collar, and wherein the neck has a diameter smaller than a diameter of the head so that an annular chamber is defined communicating with the inlet to the vacuum means.

8. The tool as claimed in claim 7, further comprising sealing means for sealing the neck portion of the spool in the mating collar.

9. The tool as claimed in claim 8, wherein the sealing means comprises a first o-ring disposed on the head end of the spool and sealing inside the extraction tube, a second o-ring disposed on an outer surface of the inner tube and sealing on the mating collar, and a third o-ring disposed on a body portion of the spool adjacent the neck and sealing in the mating collar.

10. The tool as claimed in 9, wherein the extraction tube abuts the head end of the spool, wherein the spool has a closed axial hole in a body end opposite the head end, and wherein a spring is disposed in the closed hole to bias the spool against the extraction tube.

11. The tool as claimed in claim 1, wherein the portable housing includes a handle portion and a power head portion, and wherein said vacuum means comprises a diaphragm pump mounted in the power head portion and connected to extract a flow of solder through the axial bore of the heating rod, the diaphragm pump having a piston with an oblong piston head, a long axis of the oblong piston head aligned on an axial plane of the housing, the diaphragm pump having an inlet valve and an outlet valve aligned on the axial plane.

12. The tool as claimed in claim 11, wherein the diaphragm pump has a valve diaphragm with an inlet flap at an inlet port and an outlet flap at an outlet port, and wherein the inlet port includes a valve seat on which inlet flap rests to close the inlet port and a flap stop surface opposite and oblique to the valve seat, and wherein the outlet port includes a valve seat on which outlet flap rests to close the outlet port and a flap stop surface opposite and oblique to the valve seat.

13. The tool as claimed in claim 11, wherein the diaphragm pump includes a drive motor with an eccentrically rotating shaft and a counterbalance mounted by screw threads to the shaft.

14. A portable electric desoldering tool, comprising:
    a portable housing;
    an outer tube mounted in the housing and extending therefrom;
    an inner tube mounted in the housing and disposed coaxially in the outer tube, the inner tube having a first end and a second end joined by a conical midsection;
    a heating rod having an axial bore supported coaxially in the first end of the inner tube, a tip of the heat member extending from the inner tube; and
    an extraction tube disposed in the second end of the inner tube, a first end of the tube abutting the conical midsection to form a seal, an exit end of the heating rod axial bore communicating with the extraction tube.

15. The tool as claimed in claim 14, further comprising heating means disposed in a space between the inner tube and the outer tube, and surrounding the inner tube, wherein the heating rod extends through a portion of the inner tube including the heating means.

16. The tool as claimed in claim 14, further comprising accumulator means disposed in the extraction tube to solidify and collect solder drawn therein.

17. The tool as claimed in claim 14, further comprising a spool having a head, an end of the head disposed at an exit end of the extraction tube, the head end having an elongated, axial cavity communicating with the extraction tube and leading to a hole extending outward from the cavity at a neck, the cavity and hole providing a flow path to the vacuum means, wherein the vacuum means includes a mating collar in which the neck of the spool is disposed, the vacuum means having an inlet in the mating collar, and wherein the spool neck has an outer diameter less than an outer diameter of the head to define an annular chamber in the mating collar communicating with the inlet to the vacuum means.

18. The tool as claimed in claim 14, further comprising sealing means for sealing the neck portion of the spool in the mating collar.

19. The tool as claimed in claim 18, wherein the sealing means comprises a first o-ring disposed on the head end of the spool and sealing inside the extraction tube, a second o-ring disposed on an outer surface of the inner tube and sealing on the mating collar, and a third o-ring disposed on a body portion of the spool adjacent the neck and sealing in the mating collar.

20. The tool as claimed in 17, wherein the spool has a blind axial hole in a body end opposite the head end, and wherein a spring is disposed in the blind hole to bias the spool against the extraction tube.

21. The tool as claimed in claim 14, further comprising a stainless steel liner disposed in the axial bore of the heat member.

22. The tool as claimed in claim 14, further comprising a glass liner disposed in the axial bore of the heat member.

23. A portable electric desoldering tool, comprising a housing having a handle and a power head, and having an axial plane from a front to a rear of the housing;

a heating rod extending from the power head in the axial plane and having an axial bore therethrough; and a diaphragm pump mounted in the power head and connected to extract a flow of solder through the axial bore of the heating rod, the diaphragm pump having a piston with an oblong piston head, a long axis of the oblong piston head aligned on the axial plane, the diaphragm pump having an inlet valve and an outlet valve aligned on the axial plane.

24. The tool as claimed in claim 23, wherein the diaphragm pump has a valve diaphragm with an inlet flap at an inlet port and an outlet flap at an outlet port, and wherein the inlet port includes a valve seat on which inlet flap rests to close the inlet port and a flap stop surface opposite and oblique to the valve seat, and wherein the outlet port includes a valve seat on which outlet flap rests to close the outlet port and a flap stop surface opposite and oblique to the valve seat.

25. The tool as claimed in claim 23, wherein the diaphragm pump includes a drive motor with an eccentrically rotating shaft and a counterbalance mounted to the shaft by a screw threaded shaft.

\* \* \* \* \*